Sept. 9, 1924.
S. C. ROWLAND
BUMPER FOR MOTOR VEHICLES
Filed July 21, 1921
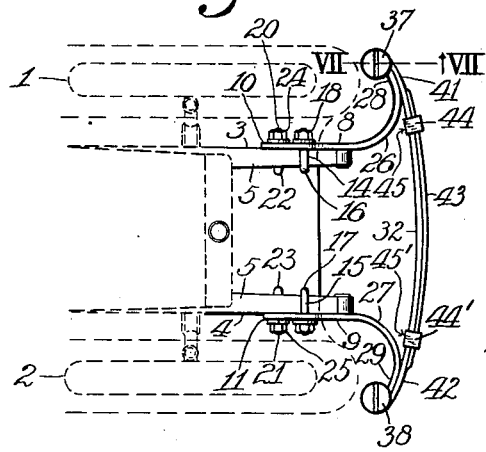
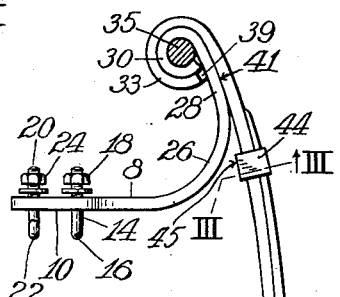
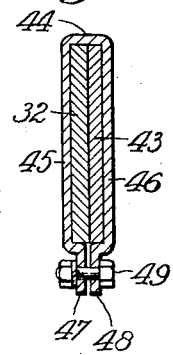
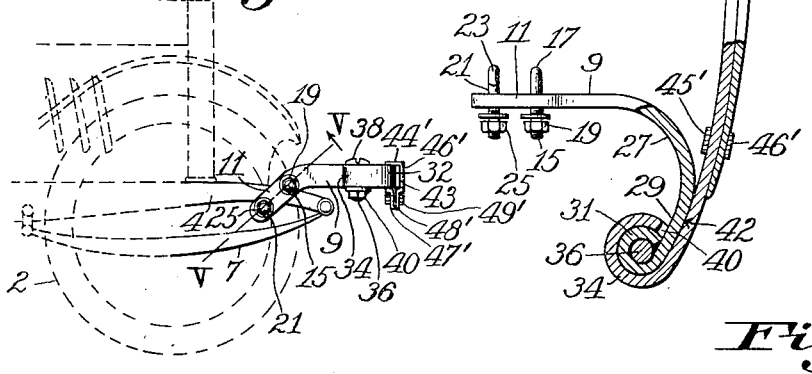
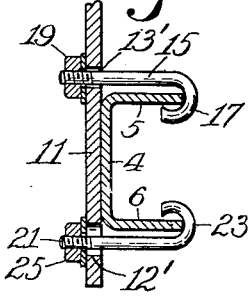
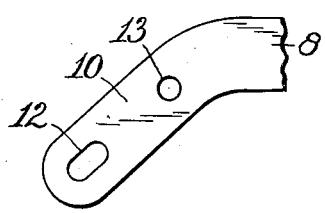
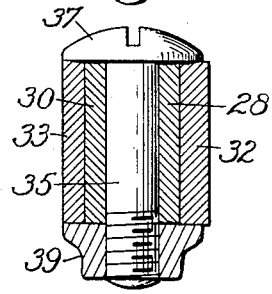
WITNESS:
R. F. Buckley.
M. D. Steele.
INVENTOR:
Samuel C. Rowland,
BY
E. F. Silvius,
ATTORNEY.

Patented Sept. 9, 1924.

1,507,934

UNITED STATES PATENT OFFICE.

SAMUEL C. ROWLAND, OF CRAWFORDSVILLE, INDIANA.

BUMPER FOR MOTOR VEHICLES.

Application filed July 21, 1921. Serial No. 486,499.

*To all whom it may concern:*

Be it known that I, SAMUEL C. ROWLAND, a citizen of the United States, residing at Crawfordsville, in the county of Montgomery and State of Indiana, have invented a new and useful Bumper for Motor Vehicles, of which the following is a specification, reference being had to the accompanying drawings and to the letters and figures of reference marked thereon.

This invention relates to a bumper of the type that is designed to be used on motor-vehicles as a protection from injury in case of collisions, the invention having reference more particularly to an elastic bumper that is designed so as to permit it to be applied to various styles of motor-vehicles, either in a factory or elsewhere.

An object of the invention is to provide an improved bumper for motor-vehicles which shall be so constructed as to be adapted to be yielding throughout in order to efficiently absorb shocks and consequently afford protection to the vehicle.

Another object is to provide an improved bumper which in the main shall not be rigid in order that a pedestrian when accidentally struck by the bumper may not be severely bruised or seriously injured, which bumper shall be of such construction as to permit a person to readily grasp and cling to it to avoid being run over by the vehicle.

A further object is to provide an improved bumper for motor-vehicles which may be composed of few and simple parts and be adapted to be shipped from the factory in knock-down condition and in compact arrangement, and permit of the assembling of the parts and mounting of the bumper in a simple manner by the purchaser and without requiring the use of special tools.

A still further object is to provide an improved vehicle bumper which shall not be costly and which shall permit of ready replacements of parts after destructive accidents, which bumper shall be durable, reliable and economical in use.

With the above-mentioned and other objects in view, the invention consists in an improved bumper structure having novel features generally and more particularly with respect to elasticity of various portions of the structure; and, the invention consists also further in the parts and combinations and arrangements of parts as hereinafter particularly described and further set forth in the appended claims.

Referring to the drawings,—Figure 1 is a top plan of the improved bumper as mounted on the forward portion of a motor-vehicle, portions of the vehicle being indicated by broken lines; Fig. 2 is a top plan of the improved bumper, on an enlarged scale, portions being in section; Fig. 3 is a sectional detail on the line III—III in Fig. 2, on an enlarged scale; Fig. 4 is a side elevation of Fig. 1; Fig. 5 is a fragmentary section approximately on the line V—V in Fig. 4, on an enlarged scale; Fig. 6 is a side elevation of a portion of one of the bumper arms; and, Fig. 7 is a section approximately on the line VII—VII in Fig. 1 on an enlarged scale.

Similar reference characters in the various figures of the drawings indicate corresponding or like elements or features of construction herein referred to in detail.

A familiar type of automobile comprises forward wheels 1 and 2, and frame bars 3 and 4 composed of channel section steel, each bar having an upper flange 5 and a lower flange 6, the forward portions of the bars being curved downwardly, and the end of each frame bar is supported by a spring 7, as will be understood.

The improved bumper has two arms comprising straight horizontal main portions 8 and 9 respectively from which oblique angled base portions 10 and 11 extend which are designed to be located on the outer sides of the frame bars 3 and 4 respectively. One base portion has a longitudinal slot 12 adjacent to its end and also a bolt hole 13 at a suitable distance from the slot; and the remaining base portion has a similarly arranged slot 12′ and a bolt hole 13′. Each base portion is provided with two hook-bolts, so that the base portion 10 has a bolt 14 and the base portion 11 has a bolt 15 arranged in the bolt holes respectively and having hooks 16 and 17 respectively. The bolts extend across the tops of the frame bars 3 and 4 respectively and the hooks engage the flange 5 of the bars, the bolts having ends 18 and 19 thereon at the outer side of the base portion whereby to secure the base portion to the frame bar. Two similar bolts 20 and 21 are arranged in the slots respectively and extend under the lower flange and have hooks 22 and 23 which engage the flanges respectively, the bolts having nuts 24 and 25 to secure the base portions to the frame bars. The slots permit the bolts to assume various positions in case the height of the frame bars are different on different vehicles, and also permit the main portions 8 and 9 of the arms to be slightly changed from the horizontal if desired. The arms of the bumper preferably are composed of spring-steel bars or plates and have outwardly curved elastic portions 26 and 27 respectively from which extend approximately straight or slightly curved lateral extensions 28 and 29 respectively, having backwardly curved ear members 30 and 31 respectively. A main buffer bar 32 is provided which is slightly curved throughout its length, and is arranged against the fronts of the portions 28 and 29 of the arms respectively, and the main bar has ear members 33 and 34 that are curved backwardly and about the ear members 30 and 31 respectively. Connecting bolts 35 and 36 are arranged in the ears 30 and 31 respectively and are provided with large heads 37 and 38 respectively that engage the ear members 33 and 34 respectively. The bolts have washer nuts 39 and 40 thereon which extend under the ear members 33 and 34. The nuts are so adjusted on the bolts as to hold the adjacent ear members together but permitting slight relatively pivotal movements of the members when the bumper receives a shock which is resisted approximately at or adjacent to the points 41 and 42 on the arms respectively.

In some cases it may be desired to stiffen the main bar 32, in which case a spring-plate 43 is arranged on the front of the bar and suitably clamped thereto, the spring-plate preferably being of suitable length to extend nearly to the points 41 and 42. Suitable clamps comprise top plates 44 and 44' respectively, one top plate having strap plates 45 and 46 thereon engaging the bar 32 and the spring-plate 43 and having ears 47 and 48 on their ends which are provided with a clamp bolt 49. The top plate of the other clamp has strap plates 45' and 46' thereon similarly provided with ears 47' and 48' and a clamp bolt 49'. The clamps are so arranged that the strap plates 45 and 46 are a short distance forward of the curved portions 26 and 27 of the arms respectively.

It should be understood that the bumper may be arranged on the rear end portion of a motor vehicle with advantage, and in some cases may be secured to rearward ends of frame bars as above described.

In practical use, in case the bumper is forced against an obstacle, that portion of the bumper receiving the greater thrust will yield, in many cases sufficiently to avoid damage by fracture. In case the thrust is at the middle portion of the main bar 32, that portion yields most and the resistance is sustained on the portions 28 and 29 of the arms, or in severe cases on the curved portions 26 and 27, the curved portions also yielding slightly; and, in some cases the clamps when present on the bumper may be forced back into contact with the curved portions of the arms with the result that the main bar of the bumper is automatically reinforced by the relatively stiff portions adjacent to the main portions 8 and 9 of the arms. The shocks or thrusts on the bumper are ultimately resisted longitudinally by the frame bars 3 and 4 of the vehicle, so that more frail parts of the vehicle are protected from injury.

Having thus described the invention, what is claimed as new is—

1. A motor-vehicle bumper including a pair of arms comprising each a base portion to be secured in place and a main portion having a laterally-curved forward portion, each of the forward portions being slightly elastic laterally and having an ear on the rear side thereof, two pivot-bolts arranged in the ears respectively and having each a head on its top bodily supported upon the ear, washer-nuts bodily supported on the lower ends of the pivot-bolts, and an elastic main bar having two ears on the rear side thereof that extend about and closely embrace the ears on the forward portions of the arms and are bodily supported upon the washer-nuts respectively.

2. In a motor-vehicle bumper, the combination of a pair of arms comprising each a straight main portion and a laterally-curved forward portion and also a downwardly-extending base portion, each of said forward portions having an ear on the rear side thereof, each base portion having a longitudinal slot adjacent to its end and also a bolt-hole distant from the slot, hook-bolts in said slots respectively, hook-bolts in said bolt-holes respectively, two pivot-bolts in said ears respectively and having each a head on its top supported upon the ear, washer-nuts on the lower ends of the pivot-bolts and extending outward beyond said ears, and a main bar having two ears on the rear side thereof that embrace the ears on said forward portions and rest upon said washer-nuts respectively.

3. In a motor-vehicle bumper, the combination of a pair of arms comprising each a main portion and a laterally-curved forward portion and also a base portion, said portions being integrally connected together and the forward portion being slightly elastic laterally and having an ear formed integrally on the rear side thereof, each base portion having a plurality of apertures therein spaced apart, securing devices in said apertures respectively to rigidly secure the base portion in place, two pivot-bolts in said ears respectively in vertical arrangement and having each a head on its top supported upon the ear, washer-nuts on the lower ends of the pivot-bolts respectively and extending outward beyond the adjacent ear, a curved elastic main bar having two portions adjacent to its opposite ends arranged against the convex sides of the curved portions respectively of said arms, said main bar having two ears integral therewith and arranged on the rear side thereof that embrace the ears on said arms respectively and are bodily supported upon said washer-nuts respectively, a curved spring-plate arranged on the convex side of said main bar and extending to portions thereof opposite to the curved portions of said arms respectively, and two clamps arranged on said main bar and said spring-plate opposite to the curved portions of said arms respectively to be thrust to and resisted thereby.

4. In a motor-vehicle bumper, the combination with a stiff supporting arm and a main bar having each a greater vertical than transverse dimension, of a laterally curved arm portion integrally connected with the supporting arm and being slightly elastic laterally, the arm portion having an ear on the rear side thereof formed integrally with said portion, a pivot bolt vertically arranged in said ear and having a head on its top that engages the top of the ear and bodily supports said bolt, said bolt having also a washer thereon beneath said ear and extending outward beyond the ear, and an ear formed integrally with said main bar and being bodily supported upon said washer, said main bar having contact with the convex side of said curved arm portion and the ear thereon embracing the ear on said arm portion.

In testimony whereof I affix my signature hereto.

SAMUEL C. ROWLAND.